United States Patent [19]

Wood

[11] 4,102,963

[45] Jul. 25, 1978

[54] METHOD OF FORMING LIGNOCELLULOSIC FIBER MATS

[75] Inventor: Dennis E. Wood, Rochester, N.Y.

[73] Assignee: Rando Machine Corporation, Macedon, N.Y.

[21] Appl. No.: 711,097

[22] Filed: Aug. 2, 1976

Related U.S. Application Data

[62] Division of Ser. No. 661,350, Feb. 25, 1976, Pat. No. 4,035,121.

[51] Int. Cl.$^2$ ............................................ B29J 5/00

[52] U.S. Cl. ..................................... 264/91; 264/121

[58] Field of Search ................................ 264/91, 121

[56] References Cited

U.S. PATENT DOCUMENTS

| | | | |
|---|---|---|---|
| 2,592,521 | 4/1952 | Thompson | 264/121 |
| 2,635,301 | 4/1953 | Schubert et al. | 264/91 |
| 3,050,427 | 8/1962 | Slayter et al. | 264/91 |
| 3,356,780 | 12/1967 | Cole | 264/91 |
| 3,792,943 | 2/1974 | Helgesson | 264/91 |

*Primary Examiner*—Robert F. White
*Assistant Examiner*—James R. Hall
*Attorney, Agent, or Firm*—Shlesinger, Fitzsimmons & Shlesinger

[57] ABSTRACT

Resin treated lignocellulosic fibers are conveyed by a stream of air downwardly to a separator containing one or more doffing rolls, which rotate adjacent a perforated scroll assembly. At the side opposite the doffers the assembly is connected to a vacuum supply which draws dust and foreign particles out of the fibers as they fall downwardly through the separator and into a hopper located in the rear of a feeder assembly housing. From here the fibers are fed by endless belts or aprons to an expansion chamber formed in the rear of a condenser housing containing one above the other a pair of endless condensers or screens. The fibers cascade downwardly in the expansion chamber to a generally wedge-shaped air bridge formed at the inlet end of the space formed between the confronting runs of the condensers. This space is connected to a pair of suction fans so that the fibers are slightly compacted as they are sucked by the fans through the throat of the air bridge and deposited on the confronting runs of the screen condensers. These two runs travel continuously toward the discharge end of the housing to produce an endless mat of fibers at the output. The upper belt is also mounted for vertical adjustment to vary the thickness of the mat.

4 Claims, 5 Drawing Figures

FIG. 2
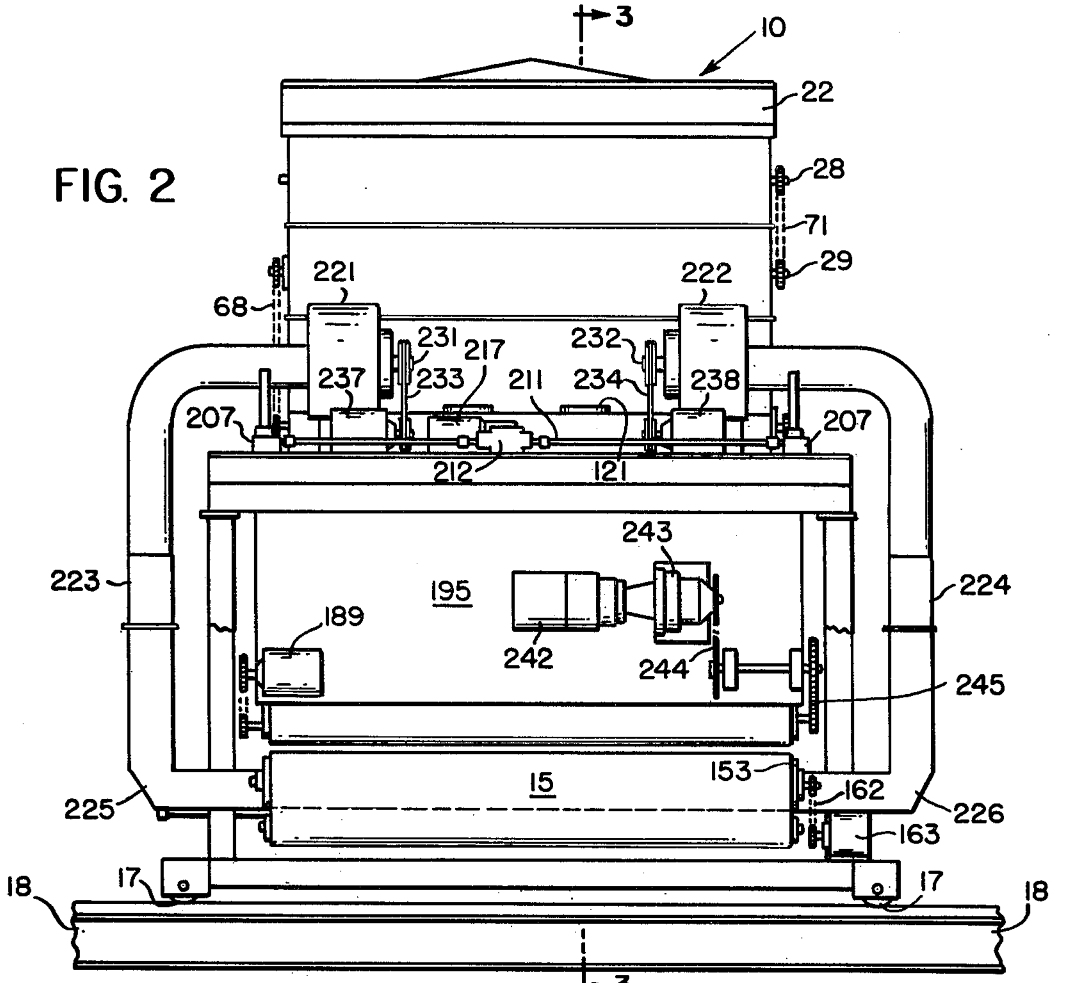
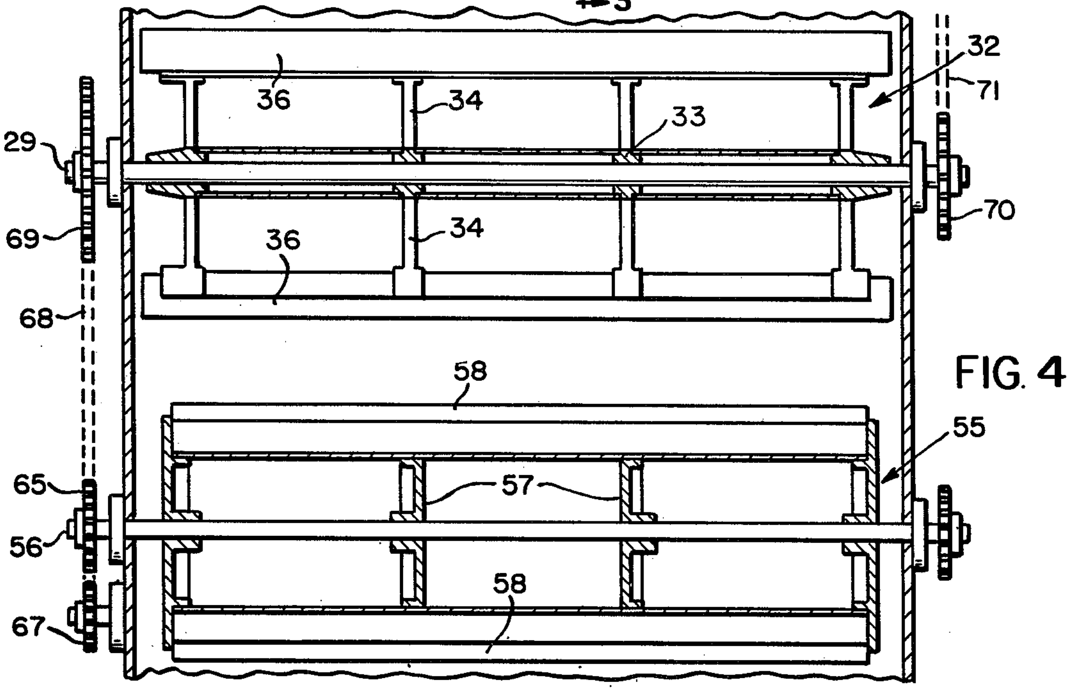
FIG. 4

METHOD OF FORMING LIGNOCELLULOSIC FIBER MATS

This is a division of application Ser. No. 661,350, filed Feb. 25, 1976 now U.S. Pat. No. 4,035,121, issued July 12, 1977.

This invention relates to the production of fiberboard, and more particularly to a method for producing a resin treated lignocellulosic fiber mat in continuous form.

There are several known processes for producing wood fiberboard from resin treated lignocellulosic fibers. Usually these processes are classified as either a wet or a dry method. In a typical wet method the raw material, such as wood fibers or chips, is softened by heat and/or chemicals and is disintegrated into a wet pulp, which is suspended in water. The fibers are then allowed to sediment out to form uniform pulp webs, which are then divided and pressed under high pressure into dry, rigid slabs.

With the dry method, the disintegrated chips or fibers are dried and then suspended in air, and are sedimented or otherwise formed into a pulp web, which is thereafter divided into dry sheets. These sheets are then compressed under high temperature and pressures into rigid, dry slabs. Typically in such a dry process the lignocellulosic fibers are treated with a resin binder, before being formed into a web, so that after the web has been formed and divided into sheets, the resin can be activated by the application of heat and pressure to bind the fibers into the final fiberboard form.

The instant invention is concerned with the formation of a fiber web or mat from lignocellulosic fibers, which have been previously treated with a resin binder. These resin treated fibers, in dry form, are manipulated by the machine hereinafter described so as continuously to form a uniformly thick mat of compressed fibers. This mat can be cut into separate sheets and subjected to high pressure and/or temperature to activate the binder in the fibers to form the final, rigid fiberboard.

One of the major problems heretofore encountered in producing dry lignocellulosic fiber mats of the type described has been the difficulty in securing uniform mat thickness throughout the length and breadth of the mat. This non-homogeneity can be the result of several factors, including the use of poorly prepared fiber (lumpy or containing foreign particles), improper feed rate of the fibers, and improper compaction of the mat, among others.

It is an object of this invention to provide an improved dry method of continuously forming from resin treated lignocellulosic fibers a uniformly thick fiber mat of the type that is used for producing wood fiberboard and the like.

A further object of this invention is to provide a novel method of continuously separating and distributing resin treated lignocellulosic fibers into a uniformly thick mat free from undesirable voids and fiber clusters.

Still another object of this invention is to provide a method of the type described which is suitable for use with an extremely wide range of fibers that are employed to manufacture wood fiberboard and the like.

Other objects of the invention will be apparent hereinafter from the specification and from the recital of the appended claims, particularly when read in conjunction with the accompanying drawings.

In the drawings:

FIG. 2 is a fragmentary front elevational view of this machine;

Figure 3A:
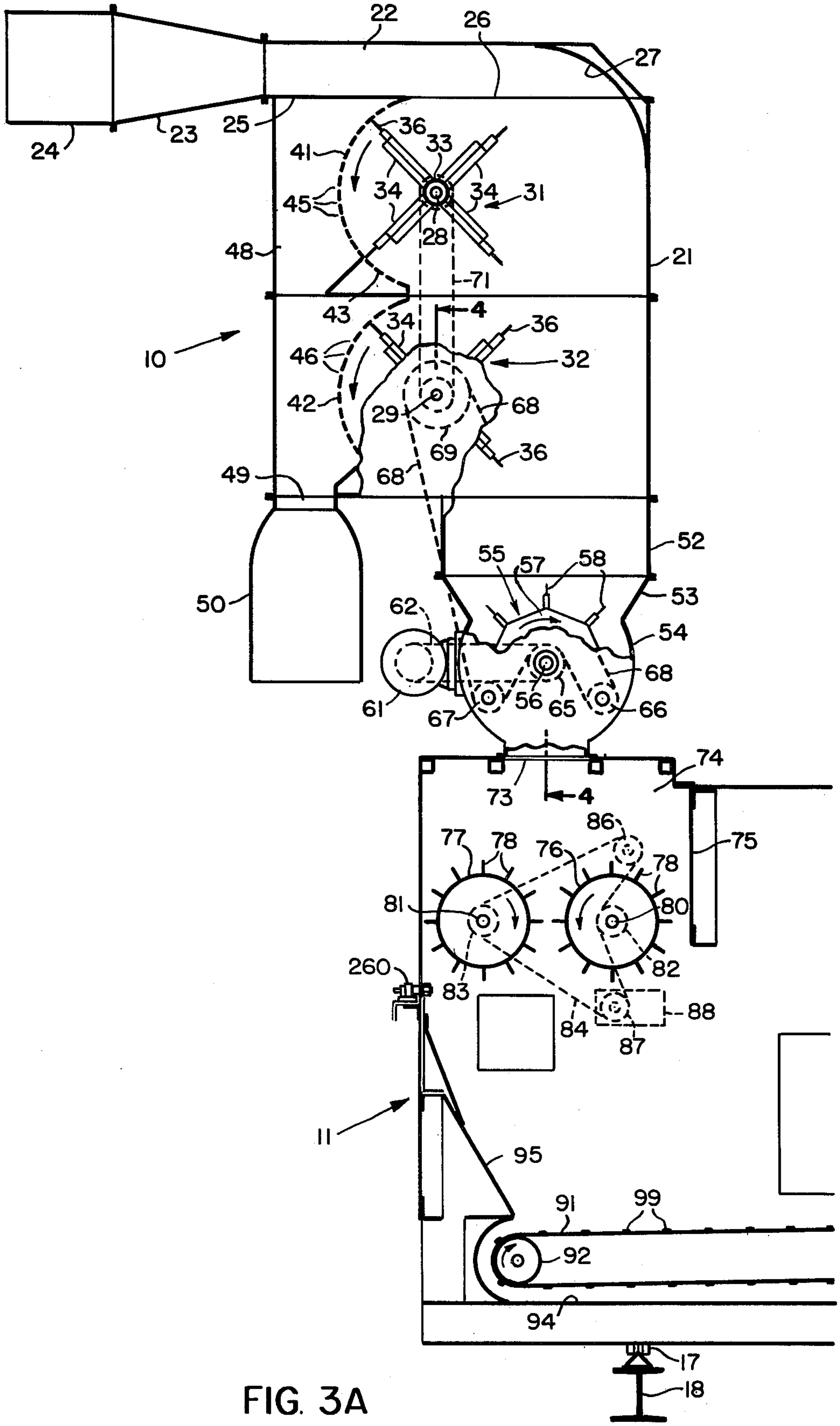
Figure 3B:
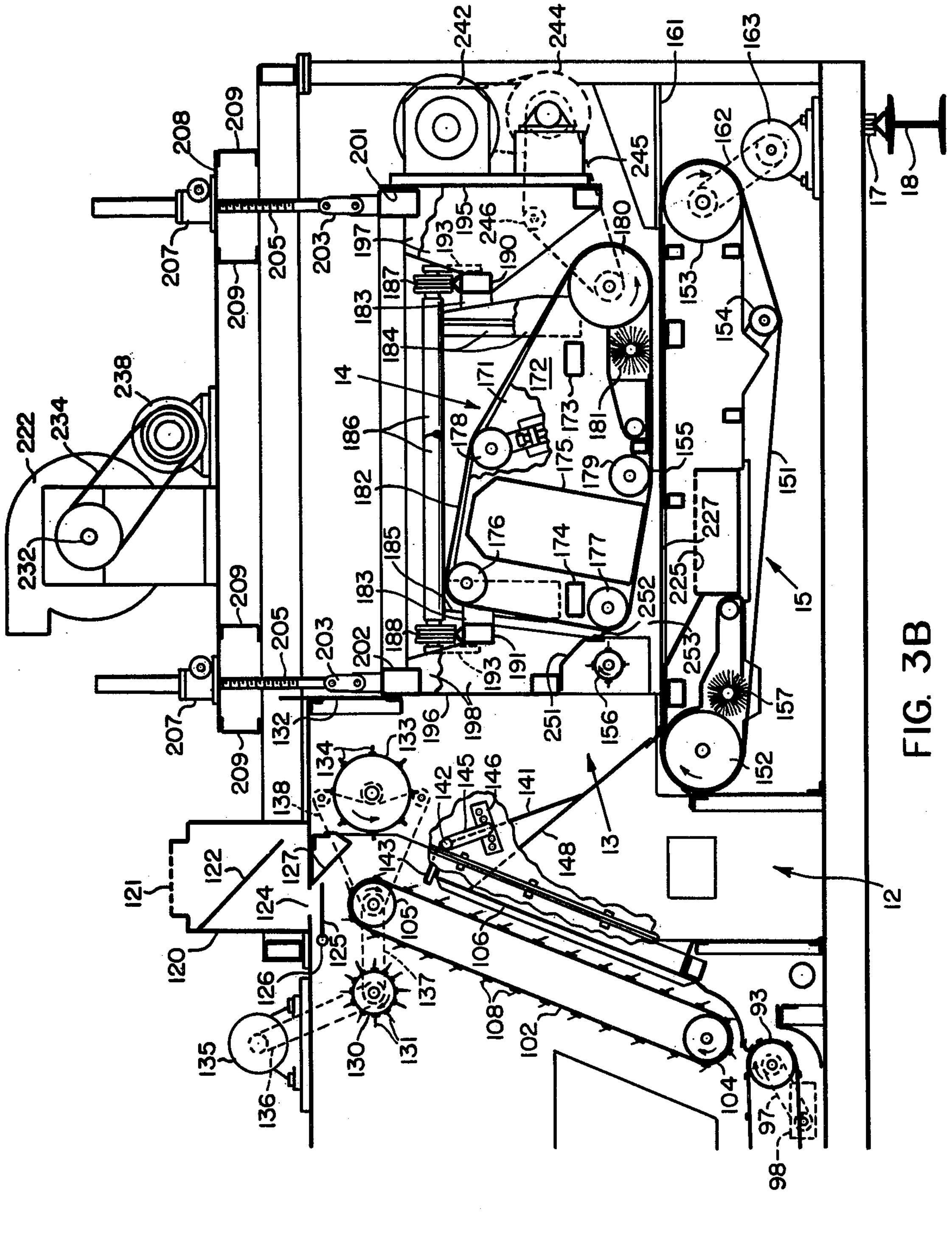

FIGS. 3A and 3B form matching halves of an enlarged fragmentary sectional view of this machine taken along the line 3—3 in FIG. 2 looking in the direction of the arrows; and FIG. 4 is an enlarged fragmentary sectional view taken along the line 4—4 in FIG. 3A looking in the direction of the arrows.

Referring now to the drawings by numerals of reference, and first to FIGS. 3A and 3B, 10 denotes generally a separator section of the machine where incoming, resin treated fibers are separated from a pneumatic air stream which is used to convey the fibers to one or more such machines in a system thereof. From the separator 10 fibers are fed into the housing 11 of a feeder assembly, which feeds the fibers forwardly and upwardly to an expansion chamber which is formed in the rear of a condenser housing 12 which is positioned in front of housing 11. Housings 11 and 12 are supported by wheels 17 on a pair of stationary floor beams 18. From the expansion chamber the fibers are fed downwardly into a generally wedged-shaped "air bridge" 13, where they are compacted and drawn by vacuum between the confronting runs of upper and lower condensers units 14 and 15, respectively, which further compact and discharge the fibers from the front of the machine (right end in FIG. 3B) in the form of a fiber mat.

The separator 10 comprises a generally rectangular, metal housing 21 (FIG. 3A), which is mounted above the rear end of the housing 11. Mounted on top of housing 21 is a horizontally disposed fiber inlet duct 22, which is connected at its rear or outer end by a flared conduit 23 with a fiber supply duct 24. The underside 25 of duct 24 projects only part way into housing 21 towards its front wall, so that a large fiber inlet opening 26 is formed in the bottom of the duct at its inner end. Fibers that are fed to duct 24 strike a curved wear plate 27 which is positioned at the inner end of the duct, and are thus discharged downwardly through opening 26 into housing 21 as noted hereinafter.

Journaled at opposite ends in the opposed side walls of housing 21 for rotation about spaced, parallel, horizontally disposed axes are the shafts 28 and 29 of two, identical, rotatary doffers or wiper drums 31 and 32, respectively. Each doffer comprises a plurality of spoked hubs 33 (FIGS. 3A and 4) which are secured to shafts 28 and 29 at axially spaced points therealong. On each shaft these hubs 33 are arranged so that their radially projecting arms or spokes 34, which extend at right angles to each other, form four series of axially-aligned arms. Secured to the outer ends of each series of arms 34 is an elongate wiper blade 36, which is made from a strip of rubber flashing, or the like. The four blades 36 on each drum thus extend parallel to each other between the sides of housing 21.

The doffer drums 31 and 32 are partially enclosed or surrounded coaxially by semi-cylindrical partitions or scroll assemblies 41 and 42, respectively, (FIG. 3A) which extend transversely and one above the other between opposite sides of housing 21 rearwardly of the drums 31 and 32, and in spaced relation to the rear wall of the housing. These partitions 41 and 42 are positioned so that the wiper blades 36 of the associated doffers will have sweeping or sliding contact with their inner peripheral surfaces. Except for minor, imperforate portions 43 adjacent the lower edges thereof, the partitions 41 and 42 have therethrough closely spaced holes 45 and 46 which connect the space in housing 21 at the right hand side of the partitions with a vertical vacuum chamber 48, which is formed in housing 21 at the left side of the partitions 41 and 42 beneath the section 25 of duct 22. This chamber 48 is connected through an opening 49 in the bottom of housing 21 with a conduit 50, which is adapted to be connected to a vacuum supply or suction source for a purpose noted hereinafter.

Forwardly (to the right in FIG. 3A) of drums 31 and 32 the lower end of housing 21 is connected by a vertical duct 52 with the hopper-shaped upper end 53 of a cylindrical housing 54, which extends transversely across housing 11 above its rear end. Mounted to rotate in housing 54 about an axis parallel to those of the doffers 31 and 32 is a vacuum drum 55. This drum comprises a shaft 56 (FIG. 4), opposite ends of which are rotatably journaled in opposite ends of housing 54, and a plurality of spiders 57, which are secured to shaft 56 at axially spaced points therealong. Secured to the outer surfaces of the spiders 57 and projecting radially therefrom are a plurality of axially-extending wiper blades 58, which are equiangularly spaced from one another about the axis of shaft 56. When the shaft 56 is rotated, as noted hereinafter, the blades 58 have sweeping, sliding engagement with the inner peripheral surface of housing 54.

Housing 54 is fastened at its lower end on the rear end of the housing 11, and communicates through an elongate opening 73 (FIG. 3A) in the bottom thereof with a chute or hopper 74, which is formed in the upper end of housing 11 between its rear wall and a transverse partition 75 which projects downwardly from the top of the housing forwardly of opening 73. Mounted to rotate in the lower end of chute 74 beneath opening 73 and in spaced, parallel relation are two, spiked feed rolls 76 and 77, which are driven in opposite directions as indicated by the arrows in FIG. 3A.

The two feed rolls 76 and 77 are positioned so that the nip or space therebetween registers with the rear end of an endless floor apron or conveyor belt 91 (FIG. 3A), which is mounted to travel about a pair of spaced rolls 92 and 93, which are journaled at opposite sides of the housing 11 to rotate just above its floor plate 94. Roll 92 is adjustably mounted adjacent the rear wall of the housing 11 beneath an inclined guide plate 95, which projects from the rear wall of housing 11 to overlie the rear end of belt 91. Drive roll 93 is mounted in the usual manner somewhat higher off the floor than the roll 92, and is connected by sprocket wheels (not illustrated) and a chain 97 to the drive shaft of the motor 98, which is mounted at one side of the housing 11. When energized, motor 98 drives roll 93 in the direction indicated by the arrow in FIG. 3B, so that the upper reach of belt 91 travels toward the right. Projecting from the face of belt 91 are a plurality of transversely extending slats 99, which convey fibers forwarding in housing 11 as noted hereinafter.

At its forward end the floor apron 91 registers with the lower end of an inclined elevating apron or conveyor 102 (FIG. 3B) of conventional design, which is mounted to travel about a pair of rolls 104 and 105.

The upper roll 105 is mounted beneath an air plenum 120, which extends transversely across the top of housing 11 adjacent its junction with housing 12. The plenum has in its upper end a plurality of screened openings 121 (FIG. 1) for admitting air to the plenum, and contains an inclined plate or baffle 122 which extends diagonally and part way downwardly into the plenum from one side wall thereof. Baffle 122 projects beneath the openings 121, and across a transverse port or opening 124, which is formed in the top of housing 11 to admit air from the plenum. Mounted between the upper apron roll 105 and the opening 124 is an adjustable throttle plate 125, which is secured along one edge to a shaft 126. This shaft is journaled in opposite sides of housing 11 for pivotal movement by a handle (not illustrated) to swing plate 125 selectively toward and away from the air inlet opening 124 and an inclined trumpet plate 127, which projects downwardly from the top of housing 11 forwardly of the opening 124.

Journaled in housing 11 adjacent the upper end of apron 102 to rotate in spaced, parallel relation to the roll 105 at one side thereof (the left side as shown in FIG. 3B), is a conventional stripper roll 130, which has in its outer surface the usual, radially projecting pins 131. Journaled in the upper end of housing 12 to rotate parallel to the stripper roll 130 between the trumpet plate 127 and a partition 132 which projects downwardly from the top of housing 12 forwardly of the opening 124 is a doffing roll 133.

The rolls 105, 130 and 133 are adapted to be rotated in unison by a motor 135, which is mounted on top of the housing 11 adjacent the plenum 120.

The doffing roll 133 overlies an inclined fiber deflection plate 141 (FIG. 3B), which is secured along its upper edge to a pivotal shaft 142. Shaft 42 is journaled in opposite sides of housing 12 to extend beneath the lip of an inclined trumpet plate 143 which extends from housing 11 adjacent the upper end of the apron 102 into the rear end of housing 12. Two control arms, one of which is denoted at 145 in FIG. 3B, are attached to opposite ends of shaft 142 at the exterior of housing 12 for manual adjustment into different angular positions in which they are held releasably by pins (not illustrated) engageable in registering openings formed in the arms and in associated adjusting blocks 146 (only one of which is shown in FIG. 3B), which also are fastened on the outsides of housing 12.

The lower edge of plate 141 overlies a chute 148 which extends from plate 106 downwardly over the rear end of the lower condenser 15. In the embodiment illustrated, condenser 15 comprises an endless, foraminous belt or screen 151, which is mounted to travel in an endless path about a first pair of rolls 152 and 153, which are journaled in opposite sides of housing 12 for rotation about horizontal axes, and around a third roll 154, which is adjustably mounted in opposite sides of housing 12 to maintain tension in belt 151. Rolls 152 and 153 are positioned so that the upper reach of belt 151 travels from the left to the right in FIG. 3B horizontally across a support plate 155, and beneath a leveler roller 156, which is journaled in opposite sides of housing 12 to rotate in the lower end of air bridge 13 for a purpose noted hereinafter.

The upper condenser 14 comprises a pair of side panels or plates 171 and 172 (FIG. 3B), which are generally rectangular in configuration adjacent their rear ends, and tapered to rounded points at their forward ends. These side plates are secured to opposite ends of a pair of tubular, transversely extending beams 173 and 174, and to a relatively large, transversely extending housing 175. Journaled at opposite ends in the plates 171 and 172 adjacent their corners are four, parallel idler rolls 176, 177, 178, and 179. Opposite ends of a further roll 180 are journaled between the forward rounded ends of plates 171 and 172 adjacent a cylindrical brush 181, which is rotated in operative relation to roll 180 by a motor 189 (FIG. 2). An endless perforated belt or screen condenser 182 is mounted to travel in a continuous path around the outside of idler rolls 176 to 179 and the roll 180, which is driven as noted hereinafter.

The plates 171 and 172 are fastened adjacent opposite ends thereof to the lower ends of two pairs of vertically disposed legs or hangers 184 and 185. (Only one leg 185 is shown in FIG. 3B). At their upper ends legs 184 and 185 are secured to a pair of spaced, parallel, shafts 186, which are supported at opposite ends on two sets of grooved rollers 187 and 188. These rollers are mounted to roll on a pair of tubular, parallel supporting beams 190 and 191, which extend transversely across the machine adjacent opposite ends of the upper condenser. Brackets 183 releasably secure the legs 184 and 185 to the beams 190 and 191; and opposite ends of the shafts 186 are releasably secured by two pairs of torsion arms or clamps 193 to the outsides of the beams 190 and 191, respectively, normally to secure the rollers 187 and 188 against movement on these beams.

Beams 190 and 191 form part of a rigid hanger frame having transversely extending front and rear panels or walls 195 and 196 (FIG. 3B), respectively. Two pairs of spaced, parallel side webs or flanges 197 and 198 project toward each other from the walls 195 and 196, respectively, and are secured at their inner ends to the beams in spaced, parallel relation between the walls 195 and 196.

Figure 1:
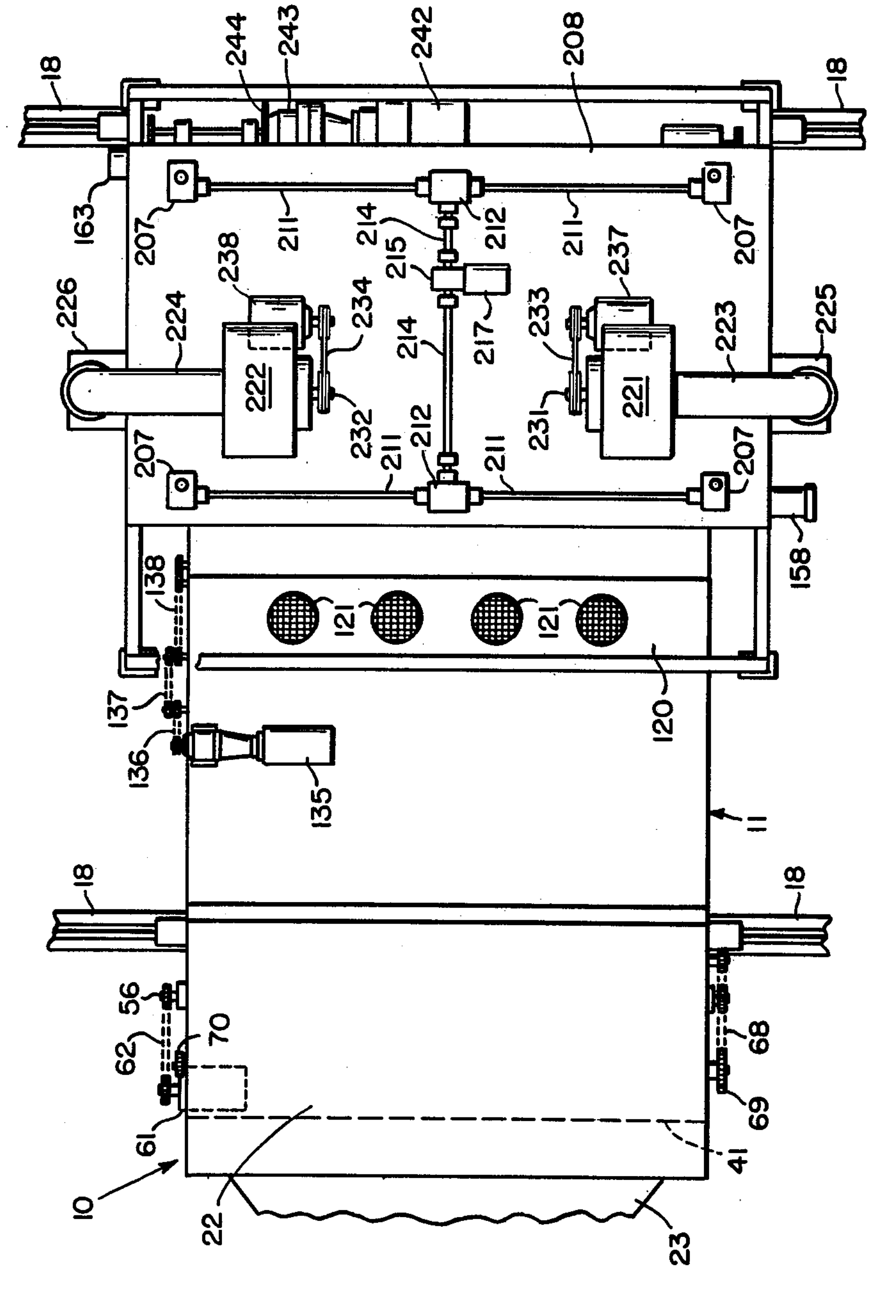
FIG. 1 is a fragmentary plan view of a machine which may be employed to practice the novel method taught herein in accordance with one embodiment of this invention for forming lignocellulosic fiber mats.

Adjacent their upper edges walls 195 and 196 are secured to the outer surfaces of two, tubular, transversely extending beams 201 and 202, respectively, which form part of a rectangular frame that is connected by four shackles 203 to the lower ends of four vertically disposed, generaly rectangularly spaced jacks 205. The upper ends of these jacks extend through the bores of four drive nuts (not illustrated), which are rotatably journaled in a conventional manner in four housings 207 that are fastened on a rectangular, horizontally disposed plate 208, which is supported by a plurality of beams 209 on top of frame 12. In each housing 207 the drive nut (not illustrated) has on its outer periphery a plurality of gear teeth (not illustrated), which are drivingly engaged with the teeth of a cooperating gear (not illustrated), which is attached to one end of four shafts 211 (FIG. 1). The opposite ends of these shafts are connected through gears (not illustrated) in a pair of housings 212 with a pair of coaxially disposed drive shafts 214, which are connected by a conventional gear mechanism 215 with the armature or drive shaft of an electric motor 217. This motor, which is also mounted on plate 208, is operable selectively to effect the raising or lowering of the upper condenser 14 as noted hereinafter.

The actual driving connections between the jacks 205 and the motor 217 may be of any conventional design, and therefore have not been described nor illustrated in detail herein. For example, assuming that the motor 217 is a reversible motor, the mechanism connecting this motor to the jacks 205 need only be operative to drive the jacks simultaneously downwardly and at the same speed, when the motor 217 is rotated in one direction, and to drive the jacks 205 simultaneously upwardly at the same speed, when the motor 217 is driven in the opposite direction.

Also mounted on plate 208 adjacent opposite sides thereof are two, spaced suction fans 221, and 222, the inlet sides of which face outwardly and are connected by ducts 223 and 224 (FIGS. 1 and 2), respectively, with plenums 225 and 226, which open on opposite sides, respectively, of the lower condenser 15 between its upper and lower runs. These two plenums communicate through a large rectangular opening 227 in the plate 155 with the space between the upper and lower condensers 14 and 15, thereby operatively connecting the space between the inlet ends of the condensers with the inlet sides of the fans 221 and 222. The impellers (not illustrated) for the fans 221 and 222 are fastened to shafts 231 and 232, respectively, which have thereon pulleys that are drivingly connected by belts 233 and 234, respectively, to pulleys that are fastened to the drive shafts or armatures of motors 237 and 238, respectively. These motors are mounted on plate 208 adjacent the respective fans 221 and 222.

When motor 242 is energized, roll 180 is driven counterclockwise about its axis as shown in FIG. 3B. The rotation of drive roll 180 is transmitted to belt 182, which in turn imparts rotation to idler rolls 176–179 in the direction illustrated by the associated arrows in FIG. 3.

In use all of the motors are coordinated so that the confronting runs of the upper and lower condensers travel forwardly at the same speed. Resin treated lignocellulosic fibers are then conveyed from a pneumatic fiber feeding system of any conventional design into the fiber inlet 24, from where the air-borne fibers pass downwardly through the opening 26 in duct 22 into the separator housing 21 adjacent the rotating doffing rolls or wipers 31 and 32. At this time the conduit 50 is connected to a vacuum or suction supply, which causes air dust and small particles to be drawn from the falling fibers in housing 21 rearwardly around the doffers 31 and 32 and through the perforations in the separator plates or partitions 41 and 42 to the discharge chamber 48. From here the dust is exhausted through outlet 50 to a baghouse filter, or the like, at some remote collection point.

The fibers passing downwardly through housing 21 are not condensed against any surface where pilling, rolling or lumping can occur. Nor do the falling fibers form large clumps, which often occur when fibers are separated from an air stream by deposit on a condensing screen or filter. Any large particles which may tend to collect on the partitions 41 and 42 are wiped therefrom by the rotating doffers 31 and 32, and are discharged together with the remaining fibers downwardly onto the top of the rotating vacuum drum 55, which simultaneously agitates and discharges the fibers downwardly into the hopper 74.

The motor 88, which drives the fiber metering or beater rolls 76 and 77, is adapted to be connected to a conventional level sensing mechanism (not illustrated) which controls the level of the fiber supply contained in housing 11 above the floor apron 91. Assuming that this sensing mechanism has energized the motor 88, the rotating beater rolls 76 and 77 feed fibers downwardly from the hopper onto the apron 91, simultaneously breaking up any clumps or lumps of fibers which may have survived the separator section 10.

Fibers are then carried by the moving floor apron 91 to the inclined elevator apron 102, the pins 108 of which gather the fibers and bear them upwardly toward the stripper drum 130. The pins 131 on this rotating drum prevent any undesirable balling up or accumulation of fibers on the apron 102, so that a uniform supply of fibers is conveyed by the apron over the top drum of 105 and beneath the pleunum 120. The excess fibers removed by the stripper drum 130 are discharged backwardly into the feed section toward the rear of the hopper. This constant movement of the fibers by the apron 91, apron 102, and stripper roll 130 reduces the possibility of any undesirable accumulation of dense masses of fibers in the hopper or feeder section.

The fibers carried by apron 102 over the top of roll 105 are exposed to the influence of the stream of air which enters through the inlet 124 and passes over the lip of the throttle plate 125. As this stream of air enters the expansion chamber formed in the rear of housing 12, it draws fibers from the pins of apron 102 and discharges them toward the rotating doffing roll 133. The ribs 134 on this roll discharge the fibers downwardly across plates 143 and 141 toward the rear end of the lower condenser 15. The effect of the air entering the pleunum 120 through the opening 124, combined with the suction created at the opening 227 in plate 155, generates at 13 an air bridge, which causes the fibers entering the rear of housing 12 to pass beneath the leveling roll 156, and to collect uniformly across the width of the wedge-shaped space formed between the belt 151 and the rear end of the upper condenser belt 182. (As shown in FIG. 3B the rear portion of belt 182 is inclined slightly to the horizontal.)

It is essential that the space between these two belts rearwardly of opening 227 be sealed, and for this purpose a sealing plate 251, which overlies the leveler roll 156, has along one edge thereof a flexible sealing strip 252, which has sliding engagement with the belt 182 to seal part of the throat of the air bridge. Also, two spacer plates, only one of which is illustrated at 253 in FIG. 3B, are releasably secured to the outsides of the upper condenser walls 171 and 172 to enclose opposite sides of the air bridge between the condensers, so that a vacuum can be developed in the throat of the bridge by the fans 222 and 223. This vacuum draws the fibrous material from the expansion chamber and partially compacts it under the suction pressure within the wedge or throat section of the air bridge 13 where the latter opens on the space between the confronting runs of the two condensers 14 and 15. Moreover, since these two runs are travelling forwardly, or toward the right in FIG. 3B, the partially compacted fibers are further compacted as they pass beyond the opening 227, and beneath the forward portion of the belt 182, which extends parallel to the section of belt 151 that passes over support plate 155. A compacted mat is thus conveyed by the two condensers 14 and 15 across the discharge plate 161 and out of the forward end of the machine in a continuous manner, as long as fibers are continuously fed into the air bridge 13.

From the foregoing it will be apparent that the instant invention provides an extremely reliable and versatile method for continuously forming lignocellulosic fiber mats, which can be severed and treated to form wooden fiberboard in a known manner. Although it is not absolutely necessary to use the separator section 10, the separator does increase the effectiveness and efficiency of the machine by removing any undesirable dust and small particles from the fibers before they are fed to the hopper section of the machine. This is important because all fibrous material must be supplied free of tramp metal and undesirable contaminates which might otherwise have a deleterious effect on the resultant fiberboard. The spiked metering rolls 76 and 77 in the hopper section of the feeder tend to beat and further separate the fibers as they are discharged downwardly onto the floor apron 91. Moreover, a nozzle 260 (FIG. 3A), which is mounted on the housing 11 beneath the feeder rolls 76 and 77, is adapted to be connected to a supply of liquid which can be discharged into the falling fibers, as desired, to help control dust and static electricity.

The flow of air through the pleunum 120 to the air bridge can be controlled by adjustment of the throttle plate 125. Moreover, the suction generated by the fans 222 and 223 can be controlled accurately by dampers (not illustrated), which are located in each duct 223 and 224 intermediate its ends. In addition the deflector plate 141 can be adjusted by its handles 145 to direct the flow of fiber into the air bridge 13 in the mat formation unit. Once a suitable position for this deflector plate has been found for a particular type of fiber, there should be no further need for its adjustment.

The output of this machine is measured volumetrically in the air bridge 13 where the fiber is compacted under steady flow conditions. The packing pressure is dependent upon the intensity of the suction pressure in the throat of the air bridge, which in turn is directly related to the static pressure of the air flow through the bridge. When the belts of the upper and lower condensers are not travelling, the fibers will tend to pack into the throat of the air bridge and back up until the suction at the opening 227 is no longer effective. Thus, by controlling the surface speed of the condensers 14 and 15, by increasing or decreasing the suction at the opening 227, and by varying the distance between the upper and lower condensers, the output of the machine will be effected.

Two typical formulas for determining the production or rating of such a machine are as follows:

1. Pounds of production per hour:

Multiply ounces of fibers per square feet times the width of the machine in feet times the forming speed in feet per minute times 3.75.

2. Square feet of production per hour:

Multiply the width of the machine in feet by the forming speed in feet per minute, multiplied by 60.

The filler strips 253, which are releasably attached to opposite sides of the upper condenser 14, come in different sizes, so that whenever the upper condenser 14 is raised or lowered by its associated jacks 205 a different set of filler strips 253 must be attached to the upper condenser to seal opposite sides of the throat or space between the inlet ends of condensers 14 and 15.

While this method has been described in connection with the use of resin treated lignocellulosic fibers, it will be readily apparent to one skilled in the art that the invention could be practiced by preparing mats made from other types of fibers or blends thereof. Also, while the condensers 155 and 182 have been described as being perforated belts or screens, it is apparent that this is necessary at least for the belt which overlies the suction source represented by fans 221 and 222. Moreover, while only a single embodiment of this invention has been described in detail herein, it will be apparent that this application is intended to cover any such modifications of the method as may fall within the scope of one skilled on the art or the appended claims.

All portions of the machine disclosed in the drawings have been described herein only in general terms, and reference is made to applicant's above-noted U.S. Pat. No. 4,035,121 for further details as to the construction and operation of this machine.

Having thus described my invention:

1. A method of forming a lignocellulosic fiber mat, comprising feeding resin treated lignocellulosic fibers into the upper end of an upright expansion chamber and beneath a stream of air which blows into the upper end of said chamber to direct the fibers downwardly in said chamber, guiding the falling fibers into an air bridge defined by a wedge-shaped section formed adjacent the lower end of said chamber, said wedge shaped section having a relatively wide end opening on said expansion chamber, and a relatively narrow end being in communication with a condenser chamber, which is located adjacent said expansion chamber, drawing the fibers by vacuum through said wedge-shaped section and into a mat-forming space formed between the confronting runs of a pair of endless belt members which are mounted one above the other in said condenser chamber, and causing said confronting runs of said members to travel in the same direction and away from said wedge-shaped section, whereby the fibers entering said space between said runs are progressively advanced and compacted between said runs into a fiber mat.

2. The method as defined in claim 1, including the step of separating dust and foreign matter from said fibers, before passage thereof to said expansion chamber, by passing the fibers vertically downwardly through a separator chamber one side of which is separated by a perforated partition from a vacuum chamber into which said dust and foreign matter are drawn as the fibers pass downwardly through the separator chamber.

3. The method as defined in claim 1, including adjusting one of said endless belt members vertically relative to the other to adjust the thickness of the fiber mat compacted between the runs of said belt members.

4. The method as defined in claim 2, including the steps of feeding said fibers through the lower end of said separator chamber, and through a pair of rotating beater rolls onto an endless floor apron, feeding the fibers from said floor apron to an elevating apron which conveys the fibers upwardly and into said upper end of said expansion chamber, and discharging said fibers from the upper end of said elevating apron into the path of a rotating doffing roll mounted in the upper end of said expansion chamber to assist in discharging said fibers downwardly into said expansion chamber.

* * * * *